United States Patent
Hiken et al.

(10) Patent No.: US 7,162,587 B2
(45) Date of Patent: Jan. 9, 2007

(54) METHOD AND APPARATUS FOR RECOVERING REDUNDANT CACHE DATA OF A FAILED CONTROLLER AND REESTABLISHING REDUNDANCY

(76) Inventors: Michael S. Hiken, 2119 Baihly Summit Dr. SW., Rochester, MN (US) 55902; Steven M. Howe, 2951 Mayowood Common Cir., Rochester, MN (US) 55902; James N. Snead, 8751 NE. 48th St., Evota, MN (US) 55934

( * ) Notice: Subject to any disclaimer, the term of this patent is extended or adjusted under 35 U.S.C. 154(b) by 274 days.

(21) Appl. No.: 10/430,487

(22) Filed: May 5, 2003

(65) Prior Publication Data
US 2004/0153727 A1 Aug. 5, 2004

Related U.S. Application Data

(60) Provisional application No. 60/379,037, filed on May 8, 2002.

(51) Int. Cl.
*G06F 15/177* (2006.01)
(52) U.S. Cl. .................. 711/135; 711/135; 711/162
(58) Field of Classification Search ............... None
See application file for complete search history.

(56) References Cited

U.S. PATENT DOCUMENTS

| | | | | |
|---|---|---|---|---|
| 5,504,882 A | 4/1996 | Chai et al. | ............ | 714/5 |
| 5,548,711 A | 8/1996 | Brant et al. | ............ | 714/5 |
| 5,761,705 A | 6/1998 | DeKoning et al. | ............ | 711/113 |
| 5,883,904 A | 3/1999 | Arimilli et al. | ............ | 714/6 |
| 5,895,485 A | 4/1999 | Loechel et al. | ............ | 711/113 |
| 5,974,506 A * | 10/1999 | Sicola et al. | ............ | 711/120 |
| 6,321,298 B1 * | 11/2001 | Hubis | ............ | 711/124 |
| 6,330,642 B1 * | 12/2001 | Carteau | ............ | 711/114 |
| 6,681,339 B1 * | 1/2004 | McKean et al. | ............ | 714/5 |
| 6,912,669 B1 * | 6/2005 | Hauck et al. | ............ | 714/6 |

* cited by examiner

*Primary Examiner*—Mano Padmanabhan
*Assistant Examiner*—Gregory Hein (57) ABSTRACT

A method, and apparatus for recovering cache data of a failed redundant storage controller and reestablishing redundancy by mirroring cache data of a primary cache memory of a first storage controller in a secondary cache memory of another storage controller. Upon a failure occurring in a storage controller, the failure is detected and, in response, a structured list of cache tags is created in the controller where having the secondary cache that is the mirror of the primary cache of the failed controller. The primary cache memory of the non-failed storage controller that was mirrored in the secondary cache of the failed controller and the secondary cache memory of the non-failed storage controller that was linked to the primary cache of the failed controller are flushed, and an available secondary cache memory, which may be the secondary cache memory just flushed, is configured to function as a redundant cache memory for the primary cache memory of the non-failed storage controller that was mirrored in the secondary cache of the failed controller, such that cache data in the primary cache memory of the non-failed storage controller is mirrored in the available secondary cache memory.

11 Claims, 4 Drawing Sheets

METHOD AND APPARATUS FOR RECOVERING REDUNDANT CACHE DATA OF A FAILED CONTROLLER AND REESTABLISHING REDUNDANCY

CROSS-REFERENCE TO RELATED APPLICATIONS

This application claims benefit of U.S. Provisional Patent Application No. 60/379,037, filed May 8, 2002, which is herein incorporated by reference. This patent application is related to U.S. Patent application Ser. No. 10/434,489 filed simultaneously herewith, which is herein incorporated by reference in its entirety.

BACKGROUND OF THE INVENTION

1. Field of the Invention

The present invention generally relates to data storage systems and, more particularly, to storage systems that store redundant data.

2. Description of the Related Art

Modern mass storage subsystems are used within computer networks to provide increasing storage capacities to fulfill user demands from host computer system applications. Unfortunately, access to the memory of the mass storage subsystems is slow, and as the sizes of the storage systems grow, access becomes even slower. A cost effective, prior art solution to this problem provides a cache between the host computer and the storage system. Caches are used to temporarily store instructions or data that may be repeatedly accessed by a host, in order to increase the processing speed by avoiding the longer step of loading the instructions or data from the memory of the storage system. More specifically, the first time an instruction or data location is addressed, it must be accessed from the lower speed disk memory. Subsequent accesses to the same instruction or data are done via the faster cache memory, thereby minimizing access time and enhancing overall system performance. Typically, each cache is associated with a cache controller, which manages the transfer of data between the host and the cache memory.

With the increasing size of the mass storage subsystems, the reliance on such large mass storage subsystems also generates a need for enhanced reliability. Various system configurations and geometries are commonly applied to meet the demands for higher storage capacity while maintaining or enhancing reliability of the mass storage subsystems.

A popular solution to these demands for increased capacity and reliability is the use of multiple storage modules configured in geometries that permit redundancy of stored data to assure data integrity in the case of system failures. Some of these systems in particular include redundant cache controllers. In some prior art systems including redundant cache controllers, a cache memory is shared by the redundant cache controllers, such that if one of the cache controllers fails, the redundant cache controller(s) maintains access to the cache memory and the data or instructions stored in the cache memory by the failed controller. Unfortunately, in such configurations, if the shared cache memory fails, any data or instructions stored in the failed cache memory would be lost.

In other systems including redundant cache controllers, each cache controller includes a dedicated cache memory. A significant challenge in such systems with redundant cache controllers is maintaining "cache coherency" without adversely affecting system performance. One prior art solution to the problem of maintaining cache coherency, is to maintain identical caches in each of the subsystems. In a first cache coherency maintenance solution, the entire cache may be periodically transmitted from the main cache to each of the remaining redundant cache(s). In a second cache coherency maintenance solution, each time a cache operation takes place on one cache, the redundant cache(s) is (are) notified of the operation and sent any corresponding data. As such, each of the redundant cache(s) is (are) updated. These two implementations exhibit various shortcomings upon a failure of a storage controller. Firstly, when one of the storage controllers fails, the cache memory of the redundant storage controller must subsequently be entirely searched for the mirrored data from the cache memory of the failed storage controller upon subsequent storage requests. Secondly, when one of the storage controllers fails, the redundancy of the subsystem is lost. Any data in the cache memory of the remaining storage controller is vulnerable to loss.

Therefore it is apparent that a need exists in the art for a method and apparatus for quickly accessing the cache data of a failed controller from a redundant controller, which further reduces the overhead processing time of a data storage system and reestablishes the redundancy of the data storage system.

SUMMARY OF THE INVENTION

The disadvantages of the prior art are overcome by a method and apparatus for recovering the cache data of a failed storage controller and reestablishing redundancy.

In one embodiment of the present invention, there is provided a method for recovering cache data of a failed redundant storage controller and reestablishing redundancy by mirroring cache data of a primary cache memory of a first storage controller in a secondary cache memory of another storage controller. Upon a failure occurring in a storage controller, the failure is detected and, in response, a structured list of cache tags is created in the controller where having the secondary cache that is the mirror of the primary cache of the failed controller. The primary cache memory of the non-failed storage controller that was mirrored in the secondary cache of the failed controller and the secondary cache memory of the non-failed storage controller that was linked to the primary cache memory of the failed controller are flushed, and an available secondary cache memory, which may be the secondary cache memory just flushed, is configured to function as a redundant cache memory for the primary cache memory of the non-failed storage controller that was mirrored in the secondary cache memory of the failed controller, such that cache data in the primary cache memory of the non-failed storage controller is mirrored in the available secondary cache memory.

In another embodiment of the present invention, a method for recovering cache data of a failed redundant storage controller and reestablishing redundancy includes, arranging the storage controllers into pairs, such that cache data of the primary cache memory of each of the storage controllers in the pair is mirrored in the secondary cache memory of the other storage controller in the pair. Additionally the method includes, upon a failure of the primary cache memory of a storage controller in a pair, detecting the failure and, in response, creating a structured list of cache tags in the non-failed storage controller, flushing the primary cache memory and the secondary cache memory of the non-failed storage controller, and configuring an available secondary cache memory to function as a redundant cache memory for the primary cache memory of the non-failed storage controller, such that cache data in the primary cache memory of the non-failed storage controller is mirrored in the available secondary cache memory.

Additionally, if the storage controllers comprise an odd number of storage controllers, the cache data of the primary cache memory of an unpaired storage controller is mirrored in the secondary cache memory of the unpaired storage controller.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 illustrates an alternative chained controller arrangement and recovery method.

DETAILED DESCRIPTION

Figure 1:
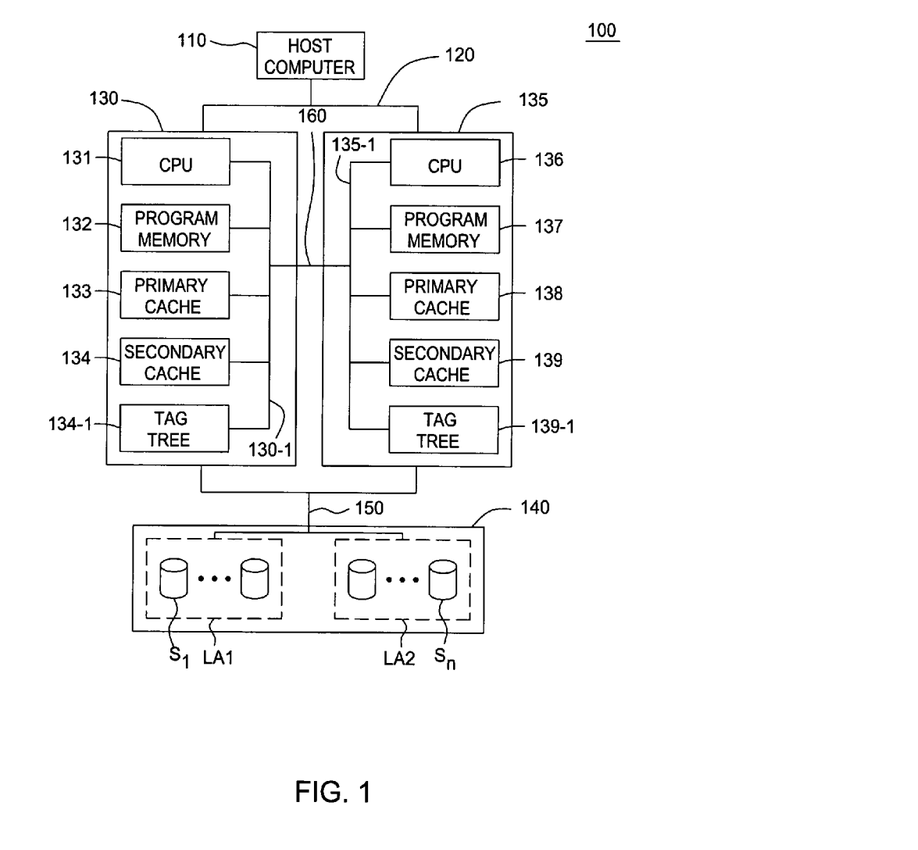
FIG. 1 depicts a high level block diagram of a redundant-cache, storage subsystem including an embodiment of the present invention.

FIG. 1 depicts a high level block diagram of a redundant-cache, storage subsystem including an embodiment of the present invention. The redundant-cache storage subsystem of FIG. 1, excluding the embodiment of the present invention, is disclosed in commonly-assigned U.S. Patent application Ser. No. 10/434,489, entitled "METHOD AND SYSTEM FOR PRESERVING CACHE DATA OF A FAILED REDUNDANT CACHE MEMORY", which is herein incorporated by reference in its entirety.

In the storage subsystem 100 depicted in FIG. 1, a host computer 110 is coupled by a bus 120 to a first storage controller 130 and a second storage controller 135 (two controllers being shown by way of example only). Each controller 130, 135 is coupled to each of a plurality of storage units S1–SiN in an array 140 by an I/O bus (or busses) 150. The array 140 is divided into logical array one (LAC) and logical array two (LAD). In the embodiment illustrated, LAC is associated with the first storage controller 130, and LAD is associated with the second storage controller 135. One of ordinary skill in the art will readily recognize that interface bus 150 between the storage controllers 130 and 135 and the disk array 140 (including disk drives S1–SiN) may be any of several industry standard interface busses including SCI, RIDE, EIDER, IPE, Fiber Channel, SA, PCI, etc. Circuits (not shown) within the storage controllers 130 and 135 appropriate to controlling the bus 150 are well known to those of ordinary skill in the art. The interface bus 120 between the storage controllers 130 and 135 and the host computer 110 may be any of several standard industry interface busses including SCI, Ether net (PLAN), Token Ring (PLAN), etc. Circuits (not shown) within the storage controllers 130 and 135 appropriate to controlling the bus 120 are well known to those of ordinary skill in the art.

The first storage controller 130 includes a CPU 131, a program memory 132 (e.g. ROM/RAM devices for storing program instructions and variables for the operation of CPU 131), a primary cache memory 133 for storing data and control information related to the data stored in the disk array 140 and a secondary cache memory 134 for storing redundant data and control information related to the primary cache memory of another storage controller (for example the second storage controller 135). The CPU 131, the program memory 132, the primary cache memory 133 and the secondary cache memory 134 are connected via the memory bus 130-1 to enable the CPU 131 to store and retrieve information in the memory devices. In addition, the first storage controller 130 includes tag memory 134-1, associated with or part of the secondary cache 134, that holds cache tags (the purpose and composition of the tag memory will be described below), also connected via the memory bus 130-1.

The second storage controller 135 is substantially identical to the first storage controller 130 and is comprised of a CPU 136, a program memory 137, a primary cache memory 138, and a secondary cache memory 139 all interconnected via a memory bus 135-1. As in the first storage controller 130, the second storage controller 135 also includes a tag memory 139-1, which is also connected to memory bus 135-1. It too may be part of the secondary cache memory or separate. To permit each storage controller to communicate with the other, the storage controllers 130 and 135 are interconnected via shared busses 160.

Each CPU 131 or 136 within each storage controller 130 or 135 can manipulate the secondary cache memory 134 or 139 and tag memories 134-1 or 139-1, respectively, of the other storage controller via shared busses 160. The primary cache memory 133 of the first storage controller 130 is used by the CPU 131 via bus 130-1 to buffer storage requests for the storage units S1–SiN. The secondary cache memory 134 (and tag memory 134-1) is reserved for use by the alternate second storage controller 135 via the shared busses 160. Similarly, the primary cache memory 138 in the second storage controller 135 is used by the CPU 136 via bus 135-1 to buffer the storage requests for the storage units S1–SiN, as the secondary cache memory 139 (and tag memory 139-1) is reserved for use by the alternate first storage controller 130 via the shared busses 160.

Briefly stated, each controller 130, 135 monitors storage requests from the host computer 110 on essentially a continuous basis. Requests are directed to either the first logical array LAC (and thus the first storage controller 130) or the second logical array LAD (and thus the second storage controller 135). Each storage controller 130, 135 is active in parallel with the other to maintain cache information in its own cache as well as the cache of the alternate storage controller. The first storage controller 130 maintains cache information related to management of LAC in its primary cache memory 133 and in the secondary cache memory 139 and its tag memory 139-1 of the second storage controller 135. Conversely, the second storage controller 135 maintains cache information related to management of LAD in its primary cache memory 138 and in the secondary cache memory 134 and its tag memory 134-1 of the first storage controller 130. In this manner, each storage controller maintains a complete snapshot of the present cache information as maintained by itself and the alternate storage controller with one small difference. The tag information in tag memories 134-1 and 139-1 is not maintained in structured lists. The structured list of tags is maintained only in the primary caches 133 or 138. The reason for this is that it would require too much CPU overhead to maintain the tags in the secondary cache's tag memory in a structured list The method of the present invention is functional after a failure is detected in the cache memory of one of the storage controllers 130, 135. Because each controller 130, 135 performs substantially the same functions, the functionality of the present invention with respect to a failure of a storage controller, is described below with respect to a failure of the first storage controller 130 and the functionality of the second storage controller 135 in response to the failure.

When a failure occurs within the first storage controller 130, and more specifically in the primary cache memory 133 of the first storage controller 130, the failure is detected by the redundant second storage controller 135. Many failure detection techniques exist in the art, and it will be appreciated by those skilled in the art that any of the failure detection techniques functional in the application of the present invention, can be advantageously employed in the present invention. For example, an ETC. Error in the memory system can be used to detect a failure in the storage controller 130.

Upon detection of a failure of the first storage controller 130, the host computer addresses any storage requests intended for LAC, originally processed by the first storage controller 130, to the secondary cache memory 139 of the redundant second storage controller 135 utilizing the bus 120, the processor 136, and the memory bus 135-1. Accordingly and as mentioned above, upon detection of the failure of the first storage controller 130, the second storage controller 135 assumes operational control of both logical arrays LAC, LAD. Also, immediately upon detection of a failure of the first storage controller 130, a structured list of cache tags 139-1 is created. The structured list of cache tags is created by the software that is executing in the second controller 135. The tags in the structured list comprise the logical block address, the block length, and the address of the location in the cache where the data is stored. This information identifies the data blocks present in the secondary cache memory 139 and their storage locations. As such, the entire secondary cache memory 139 does not need to be searched in an attempt to determine whether a specific data block is present or in an attempt to retrieve a specific data block present in the secondary cache memory 139 in response to a storage request from the host computer 110. Instead, a quick search of the structured list of cache tags 139-1 can indicate the absence or presence of a particular data block, and its location, if present, within the secondary cache memory 139. Implementing the teachings of the present invention, as such, reduces the processing time associated with the retrieval of redundant cache data of a failed controller.

Furthermore, subsequent to the detection of a failure in the storage controller 130, the primary cache memory 138 and the secondary cache memory 139 of the redundant second storage controller 135 are flushed. The flushing method after the detection of a failure is different than the flushing method during normal operation of the redundant-cache storage subsystem. After the detection of a failure of one of the storage controllers, the primary cache memory 138 and the secondary cache memory 139 of the second storage controller 135, when flushed, are flushed of all of the dirty data and all cache tags pertaining to all of the data (dirty data and resident data) in the cache memories are zeroed. Dirty data is defined as data in a cache memory that has not yet been written to a persistent memory (storage unit) and resident data is defined as data in a cache memory that has at some point already been written to a persistent memory. It should be noted that both the primary cache memory 138 and the secondary cache memory 139 of the redundant second storage controller 135 are flushed simultaneously to establish coherency. During the flushing of the cache memories 138, 139, storage requests from the host computer 110 to the primary cache memory 138 or the secondary cache memory 139 of the second storage controller 135 are written-through directly to the appropriate storage unit(s) in LAC or LAD, to ensure the coherency of the primary cache memory 138 and the secondary cache memory 139 of the second storage controller 135.

Subsequent to the flushing of the cache memories 138, 139, the secondary cache memory 139 of the second storage controller 135, is configured to function as a redundant cache memory for the primary cache memory 138. That is, when the memories 138, 139 are flushed and all the cache tags zeroed establishing coherency, the primary cache memory 138 of the storage controller 135 is used by the CPU 136 via bus 135-1 to buffer storage requests from the host computer 110 to or from LAC and LAD and the secondary cache memory 139 is used as a redundant cache memory for the primary cache memory 138. Functionally, a pending data block associated with a storage request from the host computer 110 is written to the primary cache memory 138. A cache tag identifying the data block is recorded in the primary cache memory 138 and then appended to a copy of the pending data block. The cache tag and pending data block written to the primary cache memory 138 are then immediately written (mirrored) to the secondary cache memory 139 of the storage controller 135. An acknowledgement to the storage request is sent only after the mirroring process in the secondary cache memory 139 of the second storage controller 135 is complete. During any subsequent flushing routines, when the dirty data of the primary cache memory 138 is flushed, the cache tags in the primary cache memory 138 corresponding to the flushed dirty data are reset to indicate that the data is no longer dirty data, and the mirrored cache tags in the secondary cache memory 139 corresponding to the flushed dirty data of the primary cache memory 138 are zeroed.

Figure 2:
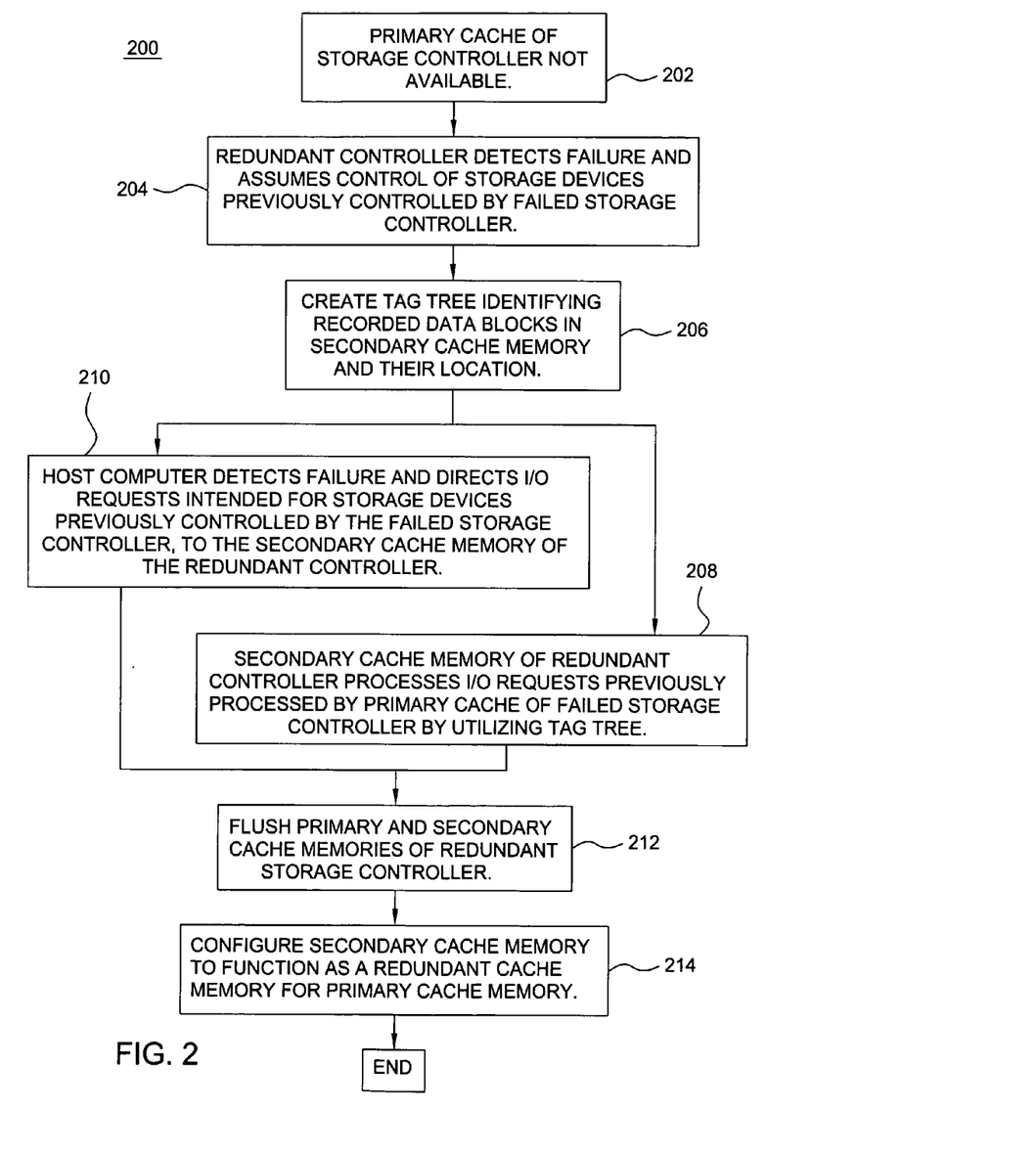
FIG. 2 depicts a flow diagram of an embodiment of a method of the present invention suitable for use in the storage subsystem of FIG. 1.

FIG. 2 depicts a flow diagram of an embodiment of a method of the present invention suitable for use in the storage subsystem 100 of FIG. 1. The method 200 is entered at step 202 wherein a failure occurs in a primary cache of a storage controller. At step 204, a redundant storage controller detects the failure and assumes control of the storage devices previously controlled by the failed storage controller.

At step 206, a structured list of cache tags is created comprising identifying the data blocks present in the secondary cache memory and their storage locations within the secondary cache. As such, the entire secondary cache memory does not need to be searched in an attempt to determine whether a specific data block is present or in an attempt to retrieve a specific data block present in the secondary cache memory in response to a storage request from the host computer. Instead, a quick search of the structured list of cache tags can indicate the absence or presence of a particular data block, and its location, if present, within the secondary cache memory.

At step 208, the secondary cache memory of the redundant storage controller, containing mirrored copies of the data blocks and cache tags of the primary cache memory of the failed storage controller, is configured to process any storage requests from the host computer intended for the failed storage controller, which was configured to control specific storage devices. For example, in the storage subsystem 100 of FIG. 1, when the storage controller 130 fails (primary cache memory 133 not available), the redundant storage controller 135 assumes control of both LAC and LAD and any storage requests intended for LAC is directed to the secondary cache memory 139 of the second storage controller 135.

At step 210, performed substantially in parallel with step 208, the host computer detects the failure of the storage controller and directs any storage requests intended for the storage devices previously controlled by the failed storage controller, to the secondary cache memory of the second storage controller. As previously mentioned, various failure detection techniques exist in the art, and it will be appreciated by those skilled in the art that any of the failure detection techniques functional in the application of the present invention, can be advantageously employed in the present invention. For example an ETC. Error in the memory system can be used to detect a failure in a storage controller.

At step 212, the primary cache memory and the secondary cache memory of the redundant controller are flushed. Although in this embodiment of a method of the present invention, the primary cache memory and the secondary cache memory of the redundant controller are depicted to be flushed at step 212, it will be appreciated by one skilled in the art that the cache memories can be advantageously flushed at different times and utilizing various methods. Preferably, the cache memories of the redundant controller should be flushed as soon as possible after the failure of a storage controller in order to achieve coherency of the primary cache memory and the secondary cache memory in order to free the secondary cache memory 139 for reestablishing the redundancy of the primary cache memory of the redundant storage controller. The primary cache memory 138 and the secondary cache memory 139 of the second controller 135, when flushed, are flushed of all of the dirty data, and all cache tags pertaining to all of the data (dirty data or resident data) in the cache memories 138, 139 are zeroed. During the flushing of the cache memories 138, 139, storage requests from the host computer 110 to the primary cache memory 138 or the secondary cache memory 139 of the second storage controller 135 are written-through directly to the appropriate storage unit(s) in LAC or LAD, to ensure the coherency of the primary cache memory 138 and the secondary cache memory 139 of the second storage controller 135.

Figure 3:
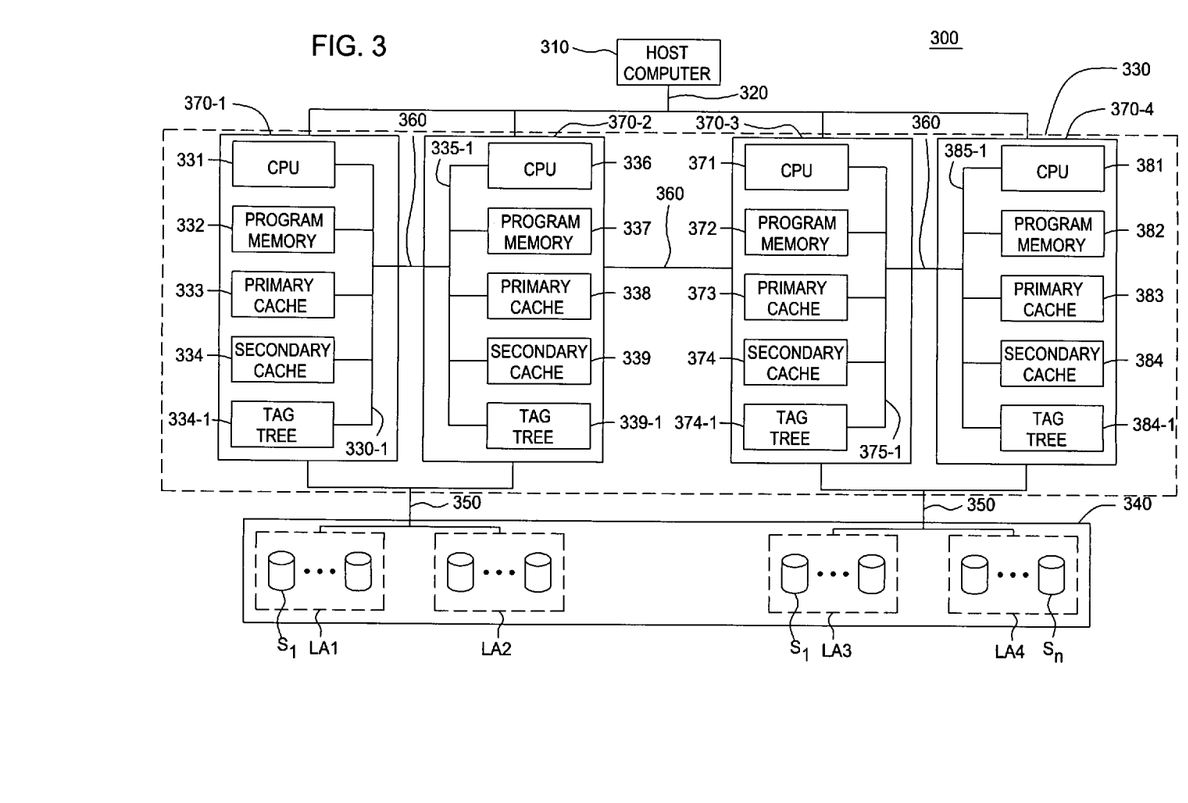
FIG. 3 depicts a high level block diagram of a redundant-cache, storage subsystem comprising an array of storage controllers, including an alternate embodiment of the present invention.

At step 214, the secondary cache memory of the second storage controller is configured to function as a redundant cache memory for the primary cache memory. That is, when the memories are flushed and coherency is established, the primary cache memory of the storage controller is used by the CPU to buffer storage requests from the host computer to or from the storage devices and the secondary cache memory is used as a redundant cache memory for the primary cache memory. Functionally, a pending data block associated with a storage request from the host computer is written to the primary cache memory. A Cache tag identifying the data block (including whether the data block is dirty data) is recorded in the primary cache memory and then appended to a copy of the pending data block. The cache tag and pending data block written to the primary cache memory are then immediately written (mirrored) to the secondary cache memory of the storage controller. An acknowledgement to the storage request is sent only after the mirroring process in the secondary cache memory of the storage controller is complete FIG. 3 depicts a high-level block diagram of a redundant-cache, storage subsystem comprising an array of storage controllers, including an alternate embodiment of the present invention. In the storage subsystem 300 shown in FIG. 3, a host computer 310 is coupled by a bus 320 to an array of storage controllers 330, (four controllers 370-1, 370-2, 370-3, 370-4 being shown by way of example only). Each storage controller 370-1, 370-2, 370-3, and 370-4, is coupled to each of a plurality of storage units Sl–Sn in an array 340 by an I/O bus (or busses) 350. The array 340 is divided into logical array one (LA1), logical array two (LA2), logical array three (LA3), and logical array four (LA4), illustratively. In the embodiment illustrated, LA1 is associated with the storage controller 370-1, LA2 is associated with the storage controller 370-2, LA3 is associated with the storage controller 370-3 and LA4 is associated with the storage controller 370-4. One of ordinary skill in the art will readily recognize that the interface bus 350 between the storage controllers 370-1, 370-2, 370-3, 370-4 and the disk array 340 (including disk drives Sl–Sn) may be any of several industry standard interface busses including SCSI, IDE, EIDE, IPI, Fiber Channel, SSA, PCI, etc. Circuits (not shown) within the storage controllers 370-1, 370-2, 370-3, 370-4 appropriate to controlling the bus 350 are well known to those of ordinary skill in the art. The interface bus 320 between the storage controllers 370-1, 370-2, 370-3, 370-4 and the host computer 310 may be any of several standard industry interface busses including SCSI, Ether net (LAN), Token Ring (LAN), etc. Circuits (not shown) within the storage controllers 370-1, 370-2, 370-3, 370-4 appropriate to controlling the bus 320 are well known to those of ordinary skill in the art.

The storage controllers 370-1, 370-2, 370-3, 370-4 include CPUs 331, 336, 371, 381, program memories 332, 337, 372, 382 (e.g. ROM/RAM devices for storing program instructions and variables for the operation of CPUs 331, 336, 371, 381), primary cache memories 333, 338, 373, 383 for storing data and control information related to the data stored in the disk array 340 and secondary cache memories 334, 339, 374, 384 for storing redundant data and control information related to the primary cache memory of another, coupled storage controller. The CPUs 331, 336, 371, 381, the program memories 332, 337, 372, 382, the primary cache memories 333, 338, 373, 383, and the secondary cache memories 334, 339, 374, 384 are connected via memory busses 330-1, 335-1, 375-1, and 385-1, respectively, to enable the CPUs 331, 336, 371, 381 to respectively store and retrieve information in the memory devices. In addition, the storage controllers 370-1, 370-2, 370-3, 370-4 include tag memories 334-1, 339-1, 374-1, and 384-1, also connected via the memory busses 330-1, 335-1, 375-1, and 385-1, respectively.

Although the storage controllers 370-1, 370-2, 370-3, 370-4 of the storage subsystem 300 of FIG. 3 are illustrated as being connected in series by the shared busses 360 for clarity of FIG. 3, the inventors disclose that each CPU 331, 336, 371, or 381 within each storage controller 370-1, 370-2, 370-3, or 370-4 can manipulate the secondary cache memories 334, 339, 374, or 384 of the other storage controllers via shared busses 360. That is, the primary cache memory of every storage controller in the array of storage controllers 330 is connected to each and every secondary cache memory of every storage controller in the array of storage controllers 330 via shared bus 360.

In accordance with the present invention, initially, storage controllers within an array of storage controllers are paired off. For example, in array 330 in the storage subsystem 300 of FIG. 3, the storage controller 370-1 is paired with the storage controller 370-2, and the storage controller 370-3 is paired with the storage controller 370-4. That is each storage controller 370-1, 370-2, 370-3, 370-4 is active in parallel with the others to maintain cache information in its own primary cache memory as well as the secondary cache memory of its paired storage controller. The storage controller 370-1 maintains cache information related to the management of LAC in its primary cache memory 333 and in the secondary cache memory 339 of the storage controller 370-2. Conversely, the storage controller 370-2 maintains cache information related to management of LAD in its primary cache memory 338 and in the secondary cache memory 334 of the storage controller 370-1. Similarly, the storage controller 370-3 maintains cache information related to the management of LA in its primary cache memory 373 and in the secondary cache memory 384 of the storage controller 370-4. Conversely, the storage controller 370-4 maintains cache information related to management of LA in its primary cache memory 383 and in the secondary cache memory 374 of the storage controller 370-4. In this manner, each storage controller maintains a complete snapshot of the present cache information as maintained by itself and its paired storage controller. If a storage controller does not have a pair (available storage controller to be paired-off with) the secondary cache memory of the lone storage controller is configured to function as a redundant cache memory for the primary cache memory of the lone storage controller.

Because the operation of a pair of storage controllers is substantially similar from one pair to the next, the functionality of the present invention with respect to a failure is described below with respect to a failure of the storage controller 370-1 and the functionality of the storage controller 370-2 in response to the failure. As in the storage subsystem 100 of FIG. 1, upon detection of a failure of the storage controller 370-1 of the storage subsystem 300 of FIG. 3, the host computer 310 addresses any storage requests intended for LAC, originally processed by the storage controller 370-1, to the secondary cache memory 339 of the redundant storage controller 370-2 utilizing the bus 320, processor 336, and the memory bus 335-1. Accordingly and as mentioned above with respect to the storage subsystem 100 of FIG. 1, upon detection of the failure of the storage controller 370-1, the storage controller 370-2 assumes operational control of both logical arrays LAC, LAD. Also, immediately upon detection of a failure of the storage controller 370-1, a structured list of cache tags 339-1 is created comprising the logical block address, the block length, the address of the location in the cache where the data is stored. This information identifies the data blocks present in the secondary cache memory 339 and their storage locations within the secondary cache memory. As such, the entire secondary cache memory 339 does not need to be searched in an attempt to determine whether a specific data block is present or in an attempt to retrieve a specific data block present in the secondary cache memory 339. Instead, a quick search of the structured list of cache tags 339-1 can indicate the absence or presence of a particular data block, and its location, if present, within the secondary cache memory 339.

Additionally, subsequent to the detection of a failure in the storage controller 370-1, the primary cache memory 338 and secondary cache memory 339 of the storage controller 370-2 are flushed. It should be noted that both the primary cache memory 338 and secondary cache memory 339 of the storage controller 370-2 are flushed simultaneously to establish coherency. The flushing is performed with substantially the same flushing method as described above for the storage subsystem 100 of FIG. 1. Briefly stated, the primary cache memory 338 and the secondary cache memory 339 of the paired redundant storage controller 370-2, when flushed, are flushed of all of the dirty data and all cache tags pertaining to all of the data (dirty data and resident data) in the cache memories are zeroed. During the flushing of the cache memories 338, 339, storage requests from the host computer 310 to the primary cache memory 338 or the secondary cache memory 339 of the storage controller 370-2 are written-through directly to the appropriate storage unit(s) in LAC or LAD, to ensure the coherency of the primary cache memory 338 and the secondary cache memory 339 of the redundant storage controller 370-2.

Subsequent to the flushing of the memories 338, 339, the remaining (not failed) storage controller of the pair (370-2) searches the array of storage controllers 330 for an available (lone) storage controller with which to pair-off. That is, the storage controller 370-2 searches the array of storage controllers 330 for a storage controller that was configured such that the secondary cache memory of the storage controller is functioning as a redundant cache memory for its own primary cache memory. For example, if the storage controller 370-3 was not paired-off and configured such that the secondary cache memory 374 was functioning as a redundant cache for the primary cache memory 373, the storage controller 370-1 would pair-off with the storage controller 370-3 to form redundant cache controllers. As such, the storage controller 370-2 maintains cache information related to the management of LAC and LAD in its primary cache memory 338 and in the secondary cache memory 374 of the storage controller 370-3 and conversely, the storage controller 370-3 maintains cache information related to management of LA in its primary cache memory 373 and in the secondary cache memory 337 of the storage controller 370-2. The storage controller 370-2 and previously lone storage controller 370-3 are now configured to be paired-off.

If a lone storage controller is not available, the secondary cache memory 339 of the remaining (not failed) storage controller 370-2 would then be configured to operate as a redundant cache memory of the primary cache memory 338. As such, the storage controller 370-2 would then be considered a lone or available storage controller for any subsequent storage controllers searching the storage controller array 330 for a storage controller with which to pair-off.

Figure 4:
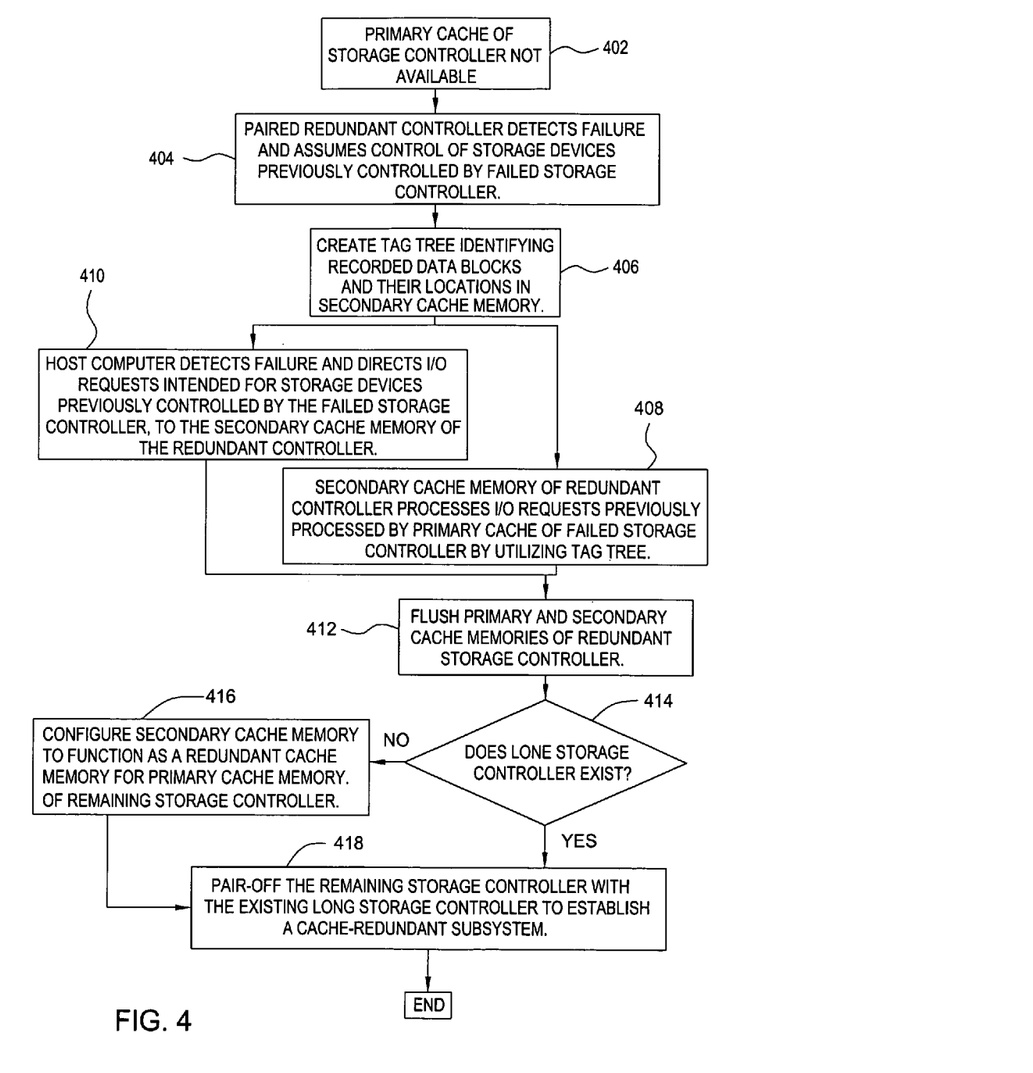
FIG. 4 depicts a flow diagram of an alternate embodiment of a method of the present invention operable in the storage subsystem of FIG. 3.

FIG. 4 depicts a flow diagram of an alternate embodiment of a method of the present invention operable in the storage subsystem of FIG. 3. The method 400 is entered at step 402 wherein a failure occurs in a primary cache of a paired storage controller. At step 404, the redundant controller detects the failure and assumes control of the storage units previously controlled by the failed storage controller.

At step 406, a structured list of cache tags is created comprising identifying the data blocks present in the secondary cache memory and their storage locations. As such, the entire secondary cache memory does not need to be searched in an attempt to determine whether a specific data block is present or in an attempt to retrieve a specific data block present in the secondary cache memory in response to a storage request from the host computer. Instead, a quick search of the structured list of cache tags can indicate the absence or presence of a particular data block, and its location, if present, within the secondary cache memory.

At step 408, the secondary cache memory of the redundant controller, containing mirrored copies of the data blocks and cache tags of the primary cache memory of the failed storage controller, is configured to process any storage requests from the host computer intended for the failed storage controller, which was configured to control specific storage devices. For example, in the storage subsystem 300 of FIG. 3, when the storage controller 370-1 fails (primary cache memory 333 not available), the redundant storage controller 370-2 assumes control of both LAC and LAD and any storage requests intended for LAC is directed to the secondary cache memory 339 of the redundant storage controller 370-2.

At step 410, performed substantially in parallel with step 408, the host computer detects the failure of the storage controller and directs any storage requests intended for the storage units previously controlled by the failed storage controller, to the secondary cache memory of the redundant storage controller. As previously mentioned, various failure detection techniques exist in the art, and it will be appreciated by those skilled in the art that any of the failure detection techniques functional in the application of the present invention, can be advantageously employed in the present invention. For example an ETC. Error in the memory system can be used to detect a failure in a storage controller.

At step 412, the primary cache memory and the secondary cache memory of the redundant controller are flushed. Although in this embodiment of a method of the present invention, the primary cache memory and the secondary cache memory of the redundant controller are depicted to be flushed at step 412, it will be appreciated by one skilled in the art that the cache memories can be advantageously flushed at different times and utilizing various methods. Preferably, the cache memories of the redundant controller should be flushed as soon as possible after the failure of a storage controller in order to attain coherency of the primary cache memory and the secondary cache memory in order to free the secondary cache memory 339 for reestablishing the redundancy of the primary cache memory of the redundant storage controller.

At step 414, the method 400 determines if a lone storage controller exists. That is, the redundant storage controller searches the array of storage controllers for a storage controller that is not paired-off with another storage controller and is configured such that the secondary cache memory of the storage controller is functioning as a redundant cache memory for its own primary cache memory. For example, if storage controller 370-3 was not paired-off with another storage controller and configured such that the secondary cache memory 374 was functioning as a redundant cache for the primary cache memory 373, storage controller 370-3 would be considered a lone storage controller. If a lone storage controller does not exist, the method proceeds to step 416. If a lone storage controller exists, the method jumps to step 418.

At step 416, the secondary cache memory of the redundant storage controller is configured to function as a redundant cache memory for the primary cache memory. That is, when the memories are flushed and coherency is established, the primary cache memory of the storage controller is used by the CPU to buffer storage requests from the host computer to or from the storage devices and the secondary cache memory is used as a redundant cache memory for the primary cache memory. Functionally, a pending data block associated with a storage request from the host computer is written to the primary cache memory. A Cache tag identifying the data block is recorded in the primary cache memory and then appended to a copy of the pending data block. The cache tag and pending data block written to the primary cache memory are then immediately written (mirrored) to the secondary cache memory of the storage controller.

At step 418, the redundant storage controller pairs-off with an existing lone controller to establish a cache-redundant subsystem. For example, if storage controller 370-3 was not paired-off and configured such that the secondary cache memory 374 was functioning as a redundant cache for the primary cache memory 373, storage controller 370-1 would pair-off with storage controller 370-3 to form redundant cache controllers. As such, storage controller 370-2 maintains cache information related to the management of LAC and LAD in its primary cache memory 338 and in the secondary cache memory 374 of storage controller 370-3 and conversely, storage controller 370-3 maintains cache information related to management of LA in its primary cache memory 373 and in the secondary cache memory 339 of storage controller 370-2. Storage controller 370-2 and previously lone storage controller 370-3 are now considered paired-off.

While the foregoing is directed to the preferred embodiment of the present invention, other and further embodiments of the invention may be devised without departing from the basic scope thereof, and the scope thereof is determined by the claims that follow.

What is claimed is:

1. In a cache-redundant data storage system having at least two storage controllers, each of the storage controllers comprising a primary cache memory and a secondary cache memory, a method for recovering cache data of a failed redundant storage controller and reestablishing redundancy, comprising:

arranging said at least two storage controllers into respective pairs, such that cache data of the primary cache memory of each of the storage controllers in each respective pair is mirrored in the secondary cache memory of the other storage controller in each respective pair;

upon a failure of one of the storage controllers in a particular one of the respective pairs, detecting the failure and, in response, creating a structured list of cache tags in the non-failed storage controller in the particular one of the respective pairs, flushing the primary cache memory and the secondary cache memory of the non-failed storage controller in a particular one of the respective pairs, and configuring an available secondary cache memory to function as a redundant cache memory for the primary cache memory of the non-failed storage controller in the particular one of the respective pairs, such that cache data in the primary cache memory of the non-failed storage controller in the particular one of the respective pairs is mirrored in the available secondary cache memory; and wherein if said at least two storage controllers comprise an odd number of storage controllers, the cache data of the primary cache memory of an unpaired storage controller is mirrored in the secondary cache memory of the unpaired storage controller.

2. The method of claim 1, wherein the structured list of cache tags identifies the physical location, in the secondary cache memory of the non-failed storage controller, in the particular one of the respective pairs of every data block of the cache data that was mirrored from the primary cache memory of the failed storage controller in the particular one of the respective pairs to the secondary cache memory of the non-failed storage controller in the particular one of the respective pairs.

3. The method of claim 1, wherein after the failure is detected and prior to said flushing, the structured list of cache tags is searched upon a subsequent storage request from a host.

4. The method of claim 1, wherein upon said flushing, the structured list of cache tags is cleared.

5. The method of claim 1, wherein the available secondary cache memory is the secondary cache memory of the unpaired storage controller of the at least two storage controllers.

6. The method of claim 5, wherein the unpaired storage controller and the non-failed storage controller in the particular one of the respective pairs are subsequently identified as paired controllers.

7. In a cache-redundant data storage system having at least two controllers, each of the storage controllers comprising a primary cache memory and a secondary cache memory, a method for recovering cache data of a failed redundant storage controller and reestablishing redundancy, comprising:
  arranging said at least two storage controllers into respective pairs, such that cache data of the primary cache memory of the storage controllers in each respective pair is mirrored in the secondary cache memory of the other storage controller in the each respective pair;
  upon a failure of one of the storage controllers in a particular one of the respective pairs, detecting the failure and in response creating a structure list of cache tags in the non-failed storage controller in the particular one of the respective pairs, flushing the primary cache memory and the secondary cache memory of the non-failed storage controller in the particular one of the respective pairs, and configuring an available secondary cache memory to function as a redundant cache memory for the primary cache memory of the non-failed storage controller in the particular one of the respective pairs, such that cache data in the primary cache memory of the non-failed storage controller in the particular one of the respective pairs is mirror in the available secondary cache memory; and
  wherein the available secondary cache memory is the secondary cache memory of the non-failed storage controller in the particular one of the respective pairs.

8. The method of claim 7, wherein the non-failed storage controller in the particular one of the respective pairs is subsequently identified as new unpaired storage controller.

9. An apparatus for storing data, comprising:
  a program memory, for storing program instructions;
  a processor for executing said program instructions;
  a primary cache memory, for storing cache data;
  a secondary cache memory, for storing redundant cache data; and
  a tag memory, for storing a structured list of cache tags associated with the cache data of the secondary cache memory;
  wherein said processor executes said program instruction to configure the apparatus to perform the steps of:
    pairing itself with another substantially similar available apparatus, such that cache data of the primary cache memory of each of the apparatuses in the pair as mirrored in the secondary cache memory of the other apparatus in the pair; and
    upon a failure of either apparatus in the pair, detecting the failure and, in response, creating a structured list of cache tags in the non-failed apparatus, flushing the primary cache memory and the secondary cache memory of the non-failed apparatus, and configuring an available secondary cache memory to function as a redundant cache memory for the primary cache memory of the non-failed apparatus such that cache data in the primary cache memory of the non-failed apparatus is mirrored in the available secondary cache memory: and
  wherein the available secondary cache memory is the secondary cache memory of the non-failed apparatus.

10. The apparatus of claim 9, wherein the structured list of cache tags identifies the physical location, in the secondary cache memory of the non-failed apparatus, of every data block of the cache data that was mirrored from the primary cache memory of the failed apparatus to the secondary cache memory of the non-failed apparatus.

11. A storage controller in a cache-redundant data storage system having at least two storage controllers, each of the at least two storage controllers in the cache-redundant storage system comprising a respective primary cache memory and a respective secondary cache memory, said storage controller comprising:
  a means for arranging said storage controller into a pair with another storage controller of said at least two storage controllers, such that cache data of the primary cache memory of each of the storage controllers in the pair is mirrored in the secondary cache memory of the other storage controller in the pair; and
  a means for detecting a failure of said primary cache memory of one of either said storage controller and said another storage controller, and upon a detection of said failure, creating a structured list of cache tags in the other of said storage controller and said another storage controller, flushing the primary cache memory and the secondary cache memory of the non-failed storage controller, and said another storage controller, and configuring an available secondary cache memory to function as a redundant cache memory for the primary cache memory of the other of said storage controller and said another storage controller, such that cache data in the primary cache memory of the other of said storage controller and said another storage controller is mirrored in the available secondary cache memory; and
  wherein if said at least two storage controllers comprise an odd number of storage controller, the cache data of the primary cache memory of an unpaired storage controller is mirrored in the secondary cache memory of the unpaired storage controller.

* * * * *